Sept. 26, 1967  G. FOURNIER ET AL  3,343,397
METHOD AND AUTOMATIC CORRUGATING MACHINE FOR
IMPRESSING TWO INTERSECTING SETS OF PARALLEL
CORRUGATIONS IN SHEET-METAL STOCK
Filed July 1, 1964  5 Sheets-Sheet 1

Inventors:
Gilbert Fournier and
Jean Alleaume

By: Nolte & Nolte
Attorneys

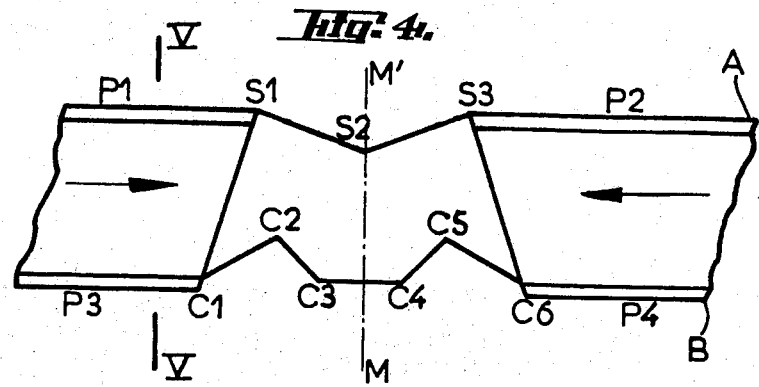
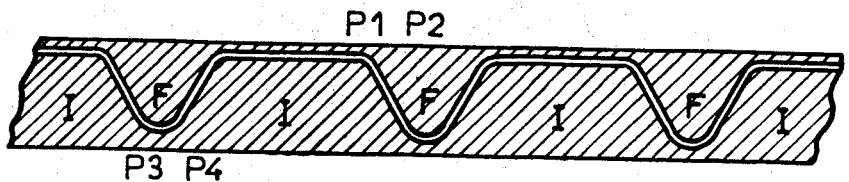

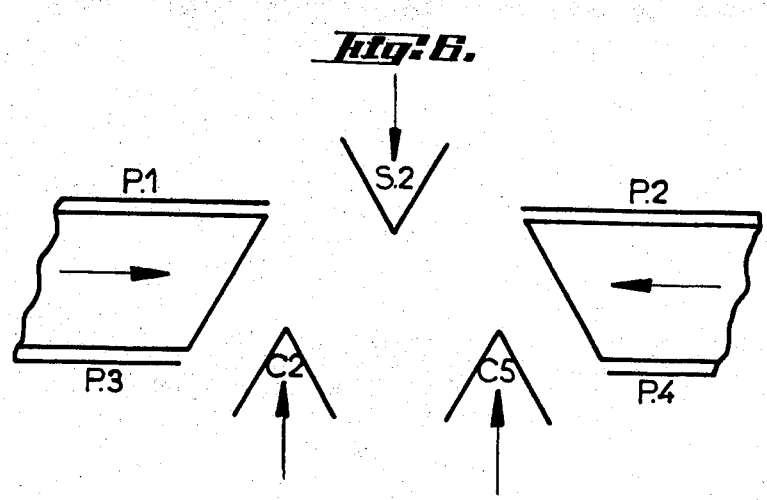
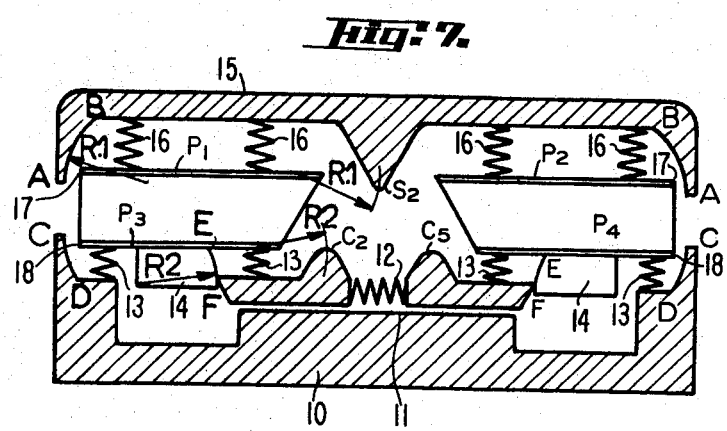

Sept. 26, 1967　　　G. FOURNIER ET AL　　　3,343,397
METHOD AND AUTOMATIC CORRUGATING MACHINE FOR
IMPRESSING TWO INTERSECTING SETS OF PARALLEL
CORRUGATIONS IN SHEET-METAL STOCK
Filed July 1, 1964　　　　　　　　　　　　5 Sheets-Sheet 5
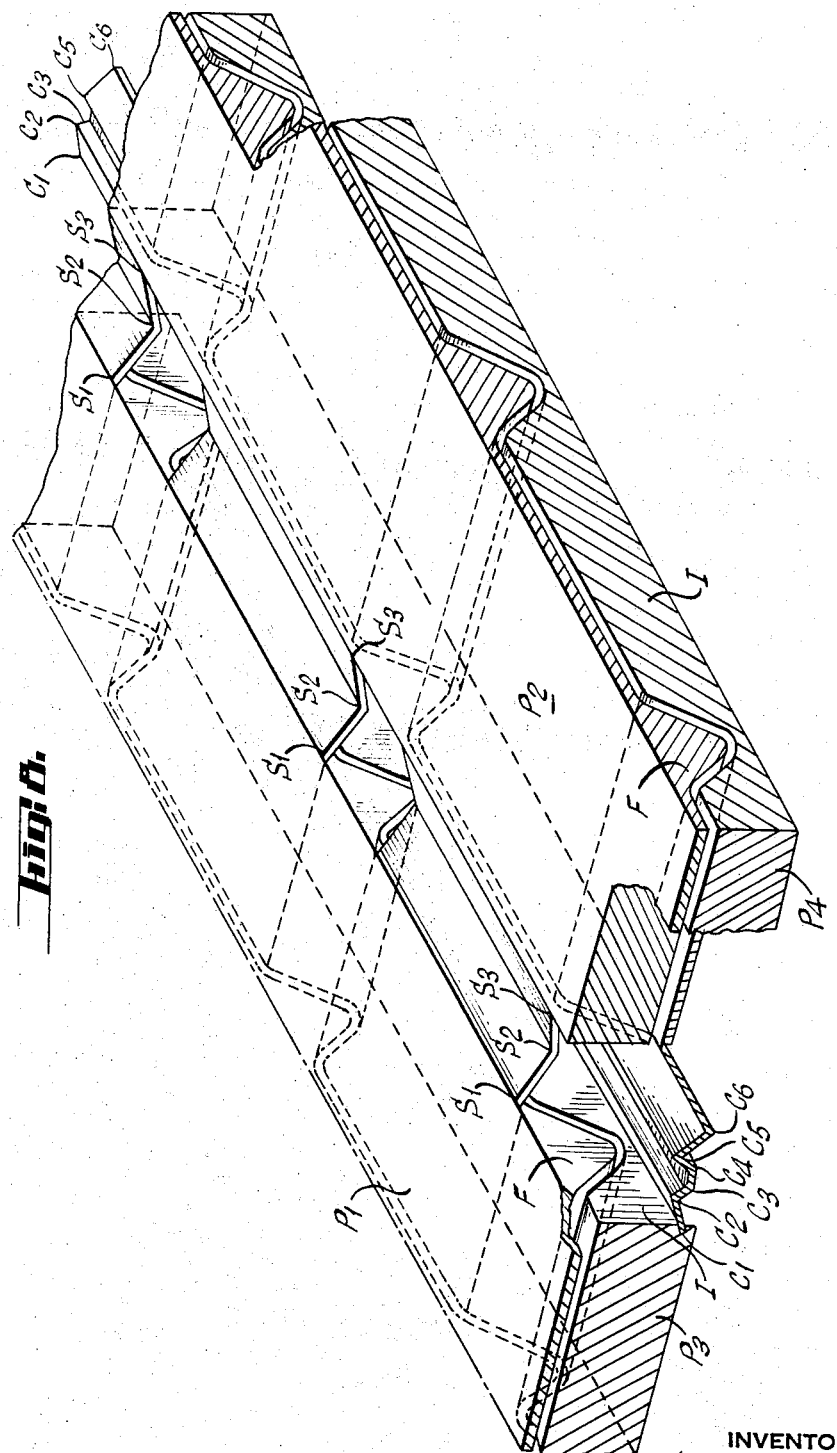
INVENTORS
GILBERT FOURNIER
JEAN ALLEAUME
BY
Nolte & Nolte
ATTORNEYS ID # United States Patent Office 3,343,397
Patented Sept. 26, 1967

3,343,397
METHOD AND AUTOMATIC CORRUGATING MACHINE FOR IMPRESSING TWO INTERSECTING SETS OF PARALLEL CORRUGATIONS IN SHEET-METAL STOCK
Gilbert Fournier, Le Havre, and Jean Alleaume, Saint-Cloud, France; said Alleaume assignor to Technigaz, Paris, France, a body corporate of France
Filed July 1, 1964, Ser. No. 379,450
Claims priority, application France, Jan. 13, 1964, 960,086
16 Claims. (Cl. 72—375)

This invention relates essentially to a method and device constituting an automatic folding machine adapted to form in generally thin sheet-metal stock two intersecting series or groups of parallel corrugations, both series being formed on the same side of the initial plane of the sheet-metal stock.

These corrugations extend in most cases but not compulsorily at right angles to each other. On the other hand, the corrugations of a same series or group are generally but not necessarily non-adjacent plane zones being formed between two successive corrugations.

In the specific form of embodiment of this invention which is described hereinafter it is assumed that these two requirements are met; of course, simple and obvious modifications should be brought to the shaping means described herein if a departure from these initial conditions were contemplated.

The first operation consists in forming the corrugations of the first series, and the second operation consists in forming the corrugations of the second series.

It is important to note that the corrugations of the first series as well as those of the second series must be obtained only by simple folding or bending operations in order to avoid any stamping or deep drawing or stretching operation and therefore any risk of reducing the thickness of the material.

The first series of corrugations or waves is made by a previous forming step by using conventional press means.

It is the essential object of this invention to create a method and machine capable of forming the second series of corrugations or waves. This machine is constructed according to the following principles:

(1) The tools or equipment should be capable during the second operation of holding the portions which are not to be shaped during this second operation, in order to prevent any alteration of the contours obtained during the first operation in the course of said second operation.

(2) During the shaping operation the shaping tools must be prevented from slipping unduly with respect to the sheet-metal element to be shaped in order to avoid marking this element at points, or along lines or surfaces other than those to be obtained eventually.

(3) Finally, the machine must form the folds without deep drawing, stamping or stretching the sheet-metal element.

Various equipments based on these three principles are suitable for forming these corrugations. These equipments comprise essentially a punch and die assembly having a deformable operative contour, the movements of the punch and of the contours constituting the die being conjugated according to a law depending on the requisite waveform.

Other features and advantages of this invention will appear as the following description proceeds with reference to the accompanying drawings showing diagrammatically by way of example various forms of embodiment of this invention. In the drawings:

FIGURE 4 illustrates a typical form of embodiment of the shaping tools as seen in a direction at right angles to the waves of the second series;

FIGURE 5 is a cross-section showing means for holding the waves or corrugations of the first series in the preceding device;

FIGURE 6 is a modified embodiment of the preceding device;

FIGURE 7 illustrates another form of embodiment of the device shown in FIGURE 6;

FIGURE 8 is a fragmentary perspective view, partially in cross-section with parts broken away, of the embodiment of the device shown on FIGURES 4 and 5, the sheet to be corrugated having been omitted.

The corrugations or waves constituting the first series or group are formed firstly along parallel, regularly spaced directions and have for instance the contour shown in FIGURE 1; this operation is termed hereinafter "first operation" and is performed by using a conventional press equipment.

Figure 2:
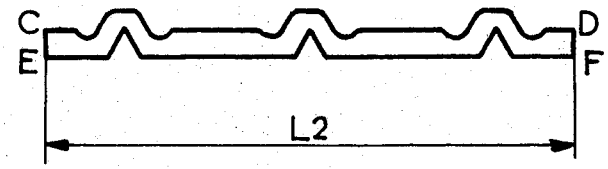
FIGURE 2 is a cross-section illustrating the second series of corrugations with a wave of the first series shown in longitudinal view.

The corrugations or waves of the second series or group to be made subsequently on the thus shaped sheet-metal element are to have the contour illustrated in FIGURE 2, and this operation is termed hereinafter "second operation."

Under these conditions, the initial flat sheet-metal element is reduced in size along two perpendicular directions, by the amounts equal to the differences, L0–L1 and L0–L2 respectively (L0, L1, L2 being the respective lengths of the sheet-metal element prior to any shaping operation, after forming the first series of corrugations, and after forming the second series of corrugations, respectively), and consequently a shape elasticity is imparted to this element along two perpendicular directions, therefore in any direction.

Figure 3:
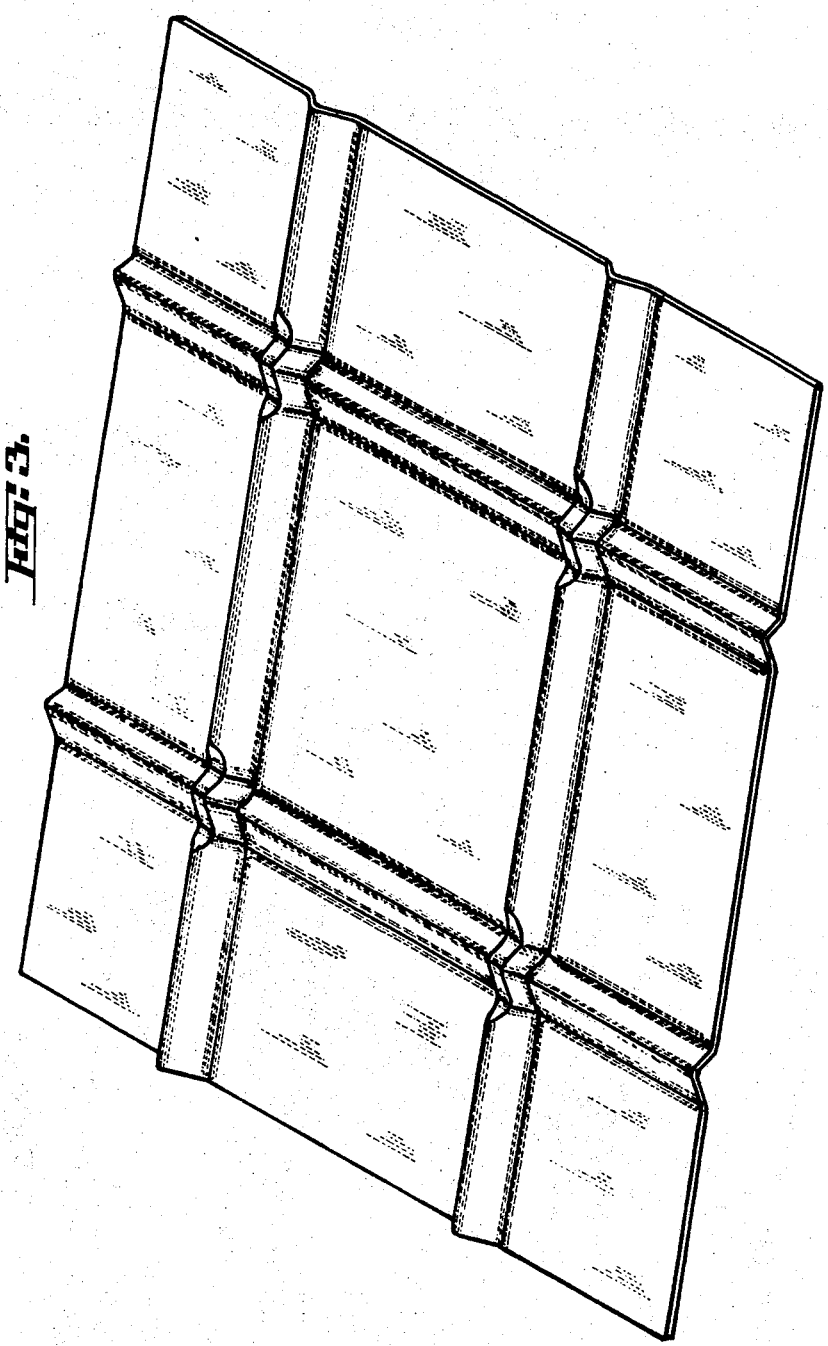
FIGURE 3 is a perspective view showing the sheet-metal element with the two intersecting series of corrugations formed therein.

A perspective isometric view shows more clearly the waveform obtained after the shaping operation (FIGURE 3).

A theoretical machine meeting the requirement and displaying the characteristics set forth hereinabove may be constructed according to the principles explained hereinafter (see FIGURES 4 and 5).

The upper portion (A) comprises three hinges S1, S2, S3 connected to a pair of plates P1, P2 carrying each one a projection F adapted to meet the requirement set forth in paragraph (1) hereinabove.

The lower portion (B) comprises six hinges C1, C2, C3, C4, C5 and C6 connected to a pair of plates P3, P4 carrying each one a relatively wide projection I adapted to meet the same requirement as set forth in paragraph (1) hereinabove.

During the initial part of the shaping operation P1, P2 and S1, S2, S3 are co-planar. On the other hand, P3, P4, C1, C2, C3, C4, C5, C6 are also co-planar.

Figure 1:
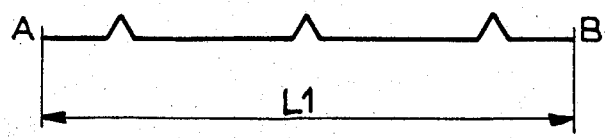
FIGURE 1 is a cross-sectional view showing the first series of corrugations formed in the sheet-metal element according to this invention.

The sheet-metal element having the configuration illustrated in FIGURE 1 is clamped between two shaped members adapted to hold the portions lying externally of the second-operation folding zone.

During the shaping operation proper the plates P1, P3 on the one hand and P2, P4 on the other hand move towards the center line MM' by a constantly equal value until the desired final shape is obtained, while the line C3, C4 is kept in a horizontal position, C3 and C4 remaining equally spaced from the axis of the figure. If the upper and lower plates are kept pressed against each other during the operation, requirements (1) and (2) set forth hereinabove are met and the movement of the knife-edges or blades $S_2$, $C_2$ and $C_5$ constituting the shaping tools proper takes place in accordance with requirements (2) and (3).

A perspective view of this tool assembly is shown on FIGURE 8 in which the metal sheet to be worked has not been shown for the sake of clarity. The device enables to shape or to form an entire discontinuous wave or corrugation of the second series or set of corrugations over the whole length of the sheet in parallel relation to this direction, by means of a set of knife-edges or blades $S_2$ equal in number to that of the wave sections forming said discontinuous corrugation or wave and having each one a length at least equal to that of the corresponding wave section to be formed. FIGURE 8 shows in full two of these successive upper knife-edges or blades and the end portion of a third one, these knife-edges consisting here of a hinge blade assembly pivoted at $S_1$, $S_2$, $S_3$. These successive upper knife-edges are spaced or separated from each other, respectively, by spacings at most equal to the transverse width of a continuous corrugation or wave of the first series. The lower knife-edges $C_2$ and $C_5$ have been shown on FIGURE 8 as respectively extending over substantially the whole useful length of the sheet, in substantially parallel relation to the discontinuous corrugation or wave of the second series to be formed, but instead of a single pair of lower hinged knife-edges $C_2$, $C_5$ extending over the whole length of the sheet, it is of course possible to provide a pair of such lower knife-edges below or underneath each continuous corrugation or wave of the first series, that is beneath the respective spacings separating the successive upper knife-edges $S_2$, and having a length corresponding to that of the transverse depressions or impressed recesses to be achieved in the continuous waves or corrugations of the first series. FIGURE 8 shows both pairs of overlying plates $P_1$, $P_3$ and $P_2$, $P_4$, both form plates F, provided with continuous downward projecting waves being integral with both upper plates $P_1$ and $P_2$ respectively, whereas both form plates I, provided with re-entrant or hollow continuous waves complementary of those of the form plates F, are integral with both lower plates $P_3$ and $P_4$, respectively. Thus, it is clearly seen that the sheet to be worked, already comprising its first series of continuous waves or corrugations, is positioned and clamped between the upper and lower form plates F and I, respectively, so that the continuous waves or corrugations of said metal sheet be encompassed by the corresponding complementary waves or corrugations of plate F on the one hand, engaging the troughs of said continuous waves or corrugations of the sheet and on the other hand of plate I, the channel-like or hollow waves of which are engaged by the raised continuous waves or corrugations of said sheet. The step of simultaneously forming an entire discontinuous wave of the second series and the corresponding transverse depressions into the continuous waves or corrugations of the first series is thus carried out by horizontally moving the groups of plates $P_1$, $P_3$ and $P_2$, $P_4$ towards each other, thereby causing the vertical downward motion of the upper knife-edges $S_2$ and the simultaneous upward motion of the lower knife-edges $C_2$ and $C_5$. During this mutual drawing together, the form plates F and I are firmly or tightly pressed against each other so as to drag or to drive the sheet engaged or gripped and jammed between these plates, transversely of said knife-edges and towards the latter. The upper and lower plates $P_1$ and $P_3$ or $P_2$ and $P_4$, respectively, may be made integral with each other at their ends in the direction parallel to the discontinuous waves or corrugations of the second series, as illustrated in particular by FIGURES 4 and 6 which show the end or terminal faces of said plates.

In practice, the machine may be constructed by adhering to the same principle as set forth in the theoretical description given hereinabove, but if desired it may also be constructed otherwise, its kinematic arrangement being apparently more complicated although the actual construction is simpler or stronger, provided that the relative movements of the shaping tools $S_2$, $C_2$ and $C_5$ as well as the shapes of the members holding the sheet-metal elements during the shaping operations be strictly or approximately the same of those obtained with the theoretical machine described hereinabove. Thus, for example, the hinges may be dispensed with and the tools may consist of three V-shaped elements $S_2$, $C_2$ and $C_5$ having their movements combined with or connected to those of the metal holding members, in order to produce a relative motion similar to that illustrated diagrammatically in FIGURE 6.

One of the various methods capable of producing the proper relative movements and of exerting the adequate pressures on the shape members is shown in FIGURE 7 of the drawings.

This embodiment comprises a substantially horizontal lower or bottom plate 10, carrying the pair or pairs of lower knife-edges $C_2$, $C_5$, both groups of upper and lower plates $P_1$, $P_3$ on the one hand, and $P_2$, $P_4$ on the other hand, respectively, supported by the lower plate 10 through the medium of resilient members or compression springs 13, on which they rest by their lower plates $P_3$, $P_4$; a substantially horizontal upper or top plate 15, carried by the upper plates $P_1$, $P_2$ by means of resilient members or compression springs 16, and with which are integral the substantially aligned upper knife-edges $S_2$. At least one of the two plates 15, 10 and preferably both of them are provided with guiding and horizontal pushing or thrusting means advantageously consisting of the portions AB and CD having a curved or straight cam or ramp profile and integral with said top and bottom plates, respectively. Both guide and push profiles AB, provided at both opposite ends of the top plate 15, respectively, are adapted to co-operate with the outer or adjacent edge 17 of the upper and lower plate $T_1$ and $T_2$, respectively, whereas likewise both profiles CD, provided at the opposite ends of the bottom plate 10, are adapted to co-operate with the outer or adjacent edges 18 of the lower plates $P_3$ and $P_4$, respectively. Moreover, both lower knife-edges $C_2$, $C_5$ of each pair of lower knife-edges preferably rest through sliding or rolling contact upon at least one substantially plane and horizontal upper surface portion 11 of the bottom plate 10 and are connected to each other by resilient drawback means or compression springs 12, for spreading them apart or moving them away from each other horizontally. At least two guide and push members 14 having an operative cam or ramp profile EF, are integral with both lower plates $P_3$, $P_4$ respectively, and co-operate through engagement with the lower knife-edges $C_2$, $C_5$ respectively. The apparatus assembly, shown on FIGURE 7, is preferably substantially symmetrical with respect to the medial longitudinal vertical plane passing through the upper knife-edge $S_2$.

This device operates as follows: the sheet to be worked, formed with continuous waves or corrugations of the first series, is positioned and clamped between the form plates F and I, not shown on FIGURE 7, which are integral with the upper and lower plates $P_1$, $P_3$ and $P_2$, $P_4$, respectively. The bottom plate 10 rests upon a stationary frame, support or holder. A downward pressure force is then exerted or applied, for example by means of a press or the like, upon the top plate 15 which therefore moves downwards. This downward motion of the plate 15 also causes, owing to the presence of springs 14 and 16, a certain simultaneous downward displacement of both groups of upper plates $P_1$, $P_2$ and $P_3$, $P_4$, respectively, carrying with them the form plates F, I and the sheet to be worked positioned therebetween. During this upward motion is effected the simultaneous shaping or forming of all the aligned wave sections of an entire corrugation of the second series due to the penetration of the knife-edge $S_2$ driven into the top of the sheet as well as of the transverse depressions into the continuous waves of the first series due to the penetration of the lower knife-edges $C_2$, $C_5$ driven through reaction into the sheet moving downwards thereonto. At the same time, during the downward motion of the plate 15 and of both groups of plates $P_1$, $P_3$ and $P_2$, $P_4$, the guiding profiles AB and CD, which have come into engagement at 17, 18, with the upper plates $P_1$, $P_2$ and with the lower plates $P_3$, $P_4$, respectively, cause both groups of overlying plates $P_1$, $P_3$ and $P_2$, $P_4$ to simultaneously move towards each other in symmetrical relationship, thereby carrying along the sheet portions closely or tightly jammed between the form plates F, I which are integral with these plates and which extend substantially at right angles to the plane of FIGURE 7. During this combined or composite horizontal and vertical motions of both groups of overlying plates $P_1$, $P_3$ and $P_2$, $P_4$, the guide profiles EF of the guiding members 14 integral with the lower plates $P_3$, $P_4$, respectively, cause the lower knife-edges $C_2$, $C_5$ to simultaneously move somewhat towards each other so as to follow the deformation of the sheet by transverse contraction or shortening during the impression of the hollow depressions into the continuous waves of the first series. In the embodiment shown on FIGURE 7, the guide profiles AB and CD are substantially equally curved with a radius of curvature $R_1$ and their concavity is directed inwards of the device. The guide profiles EF are curved with a radius of curvature $R_2$ and their convexity is directed inwards of the device.

The arcs AB, CD and EF may without any appreciable inconvenience be replaced with straight lines AB, CD and EF. Some of these arcs may be eliminated provided that the plate to be shaped has a sufficient strength and that the pressures are high enough to cause the tools to be driven by this plate. In this case, it is necessary to check very carefully that the relative thickness of the plate to be shaped and the nature of the selected plate material are not liable to produce any appreciable stamping, deep drawing or stretching effect in the final product.

Many equivalent methods may be resorted to for producing either exactly or approximately the same relative movements of the tools and holding shapes or forms, provided that these relative movements take place properly during the complete shaping operation to avoid any stamping, deep drawing or stretching effect and that the pressures exerted on the shapes or forms be sufficient to avoid any distortion of the waves or corrugations formed during the first operation, except the folding or bending step constituting the purpose of the second operation.

Of course, this invention should not be construed as being limited by the specific forms of embodiment shown and described herein by way of example, since many modifications may be brought thereto without departing from the gist and scope of the invention as set forth in the appended claims.

What we claim is:

1. A device constituting a folding machine-tool for automatically shaping in a single operative step, in an initially substantially flat sheet-metal piece formed with a first series of at least one corrugation substantially parallel to a first direction and projecting from the same side of the initial plane of said sheet-metal piece, a second series of at least one corrugation substantially parallel to a second direction intersecting said first one and projecting from said same side of the sheet-metal piece, as well as at least two transverse depressions in the crest of each corrugation of said first series, adjacent to and on either side of each intersection thereof with a corrugation of said second series, said device comprising mould-like means adapted to hold against deformation those portions of said sheet-metal piece which are not to be altered in shape, and consisting of at least two relatively movable upper elements, carrying two substantially identical male parts, respectively, aligned in spaced relationship on a same level, and of at least two relatively movable lower elements, carrying two substantially identical female parts substantially aligned in spaced relationship on a same level and registering with and complementary of said male parts, respectively, each pair of overlying upper and lower parts being adapted to accommodate in interfitting engaging relationship and to closely conform to the shape of the two opposite faces of said sheet-metal piece, respectively, to be interposed therebetween and to the contour of each corrugation of said first series, the two elements and parts of each pair being adapted to move symmetrically in translation towards and away from each other in parallel relation to said first direction; at least one upper, vertically movable, straight elongated, downward projecting, blade-like punch member of constant cross-sectional profile corresponding to the desired contour of the corrugation of said second series to be formed, said punch member extending in parallel relation to said second direction and being equidistantly disposed between said male parts; at least two lower, at least vertically movable, straight elongated, upward projecting blade-like punch members of a cross-sectional profile corresponding to the desired contour of said depressions to be formed, with their crests substantially parallel to the ridge of said upper punch member and located on a same substantially horizontal level in symmetrical relation to the vertical medial plane passing through the ridge of said upper punch member; and actuating means for simultaneously moving in opposite directions on the one hand, said two pairs of respective upper and lower superposed elements and parts at least in substantially horizontal translation and on the other hand, said upper and lower punch members.

2. A device according to claim 1, comprising means adapted to hold said upper and lower parts together with said interposed sheet-metal piece pressed against each other during the shaping operation.

3. A device according to claim 2, wherein said upper and lower punch members have their cross-sectional contour adapted to undergo a continuous deformation in conjunction with the movements of said upper and lower parts.

4. A device according to claim 3, wherein said parts consist of shaped plate-like elements and said punch members assume each one substantially the shape of a knife-edge formed by a variable salient dihedron, both faces of which are pivotally connected to each other along the edge of said dihedron, both faces of said upper dihedral punch member being also pivotally connected along their outer edge to the two upper plate-like elements, respectively, whereas the two lower dihedral punch members have their outer faces pivotally connected to the two lower plate-like elements, respectively, and their adjacent faces pivotally connected to an intermediate member along either of the two opposite sides thereof, respectively, the pivotal connections of said faces consisting of hinge means having their axes substantially parallel to the edge of said dihedrons, and further means being provided for holding said intermediate member in a substantially horizontal position and moving it vertically in translation so that its end hinge means remain equally spaced from the vertical plane passing through the edge of the upper dihedral punch member.

5. A device according to claim 2, comprising: a lower plate having at least one central portion provided with a substantially flat and horizontal top surface freely supporting in sliding engagement both of said lower punch members which are interconnected by spread-apart spring means; two pairs of superposed upper and lower elements and parts, borne by said lower plate through the medium of spring means and each one symmetrically integral with at least one guide member formed each one with a thrust cam-face cooperating in sliding engagement with said lower punch members, respectively, in order to move them towards each other during the relative movements thereof; an upper plate integral with said upper punch member and carried by said upper elements and parts through further spring means; at least two pairs of further guide members formed each one with a thrust cam-face and integral with said lower and upper plates, respectively, to co-operate, during the movements of said plates towards each other, with said two pairs of lower and upper elements and parts, respectively, so as to move same simultaneously in substantially symmetrical, horizontal relationship; and operating means for moving at least one of said plates towards the other.

6. A method of providing a sheet, having at least one set of at least one continuous corrugation extending throughout said sheet in parallel relation to a first direction and projecting from a same side of said sheet, with at least one second set of at least one corrugation extending throughout said sheet in parallel relation to a second direction intersecting said first one, each corrugation being bounded, on either side thereof and outside of its intersecting regions, by smooth uncorrugated areas and each corrugation of said second set being divided into at least two wave sections by each corrugation of said first set, said method consisting in simultaneously forming, in a same and single shaping step through pure folding and bending without any stretching of the sheet material, on the one hand, at least one entire corrugation of the second set, by simultaneously driving in at least one sheet strip to form the crests of all wave sections thereof, and on the other hand, at least one pair of depressions recessed in and extending transversely of the crest of each corrugation of said first set on either side of and adjacent to its intersection with each corrugation of the second set, by transversely impressing the crest of each corrugation of the first set, at the same time, while enabling both sheet portions, located on either side of each corrugation of the second set, respectively, to gradually and freely move towards each other, as it is being formed in order to shorten the sheet in said second direction by an amount corresponding to the thus buckled portion being formed, whereas, simultaneously all the sheet portions, lying outside of the regions to be deformed, are kept invariable in their shape to retain in particular at least the cross-sectional contour of each corrugation of the first set during the whole shaping process while preventing it from being deformed during the latter.

7. A method according to claim 6, wherein a compression force is simultaneously exerted upon said sheet, substantially in its initial plane and in transverse symmetrical relation to said second direction to promote the shortening of the sheet.

8. A shaping device for simultaneously forming in a sheet already provided with at least one first set of at least one continuous corrugation extending throughout said sheet in parallel relation to a first direction and projecting from a same side of said sheet, on the one hand, at least one second set of at least one corrugation extending throughout said sheet in parallel relation to a second direction intersecting said first one, each corrugation being bounded on either side thereof, and outside of its intersecting regions, by smooth uncorrugated areas and each corrugation of said second set being divided into at least two wave sections by each corrugation of said first set, and on the other hand at least one pair of transverse depressions recessed in and extending across the crest of each corrugation of said first set, on either side of and adjacent to its intersection with each corrugation of the second set, said device comprising: a primary forming tool for shaping at least one entire corrugation of the second set, consisting of at least one set of successive and substantially aligned, blade-like bending punches, of a number and lengths corresponding to that of the wave sections to be formed and spaced from each other by a gap substantially corresponding to the width of a corrugation of the first set, respectively; a secondary forming tool for shaping the transverse hollow depressions into all corrugations of the first set, consisting of at least one pair of blade-like folding punch-means, substantially parallel to and facing the bending punches of said primary forming tool, said folding punches extending at least at each gap separating the bending punches, respectively; and having each one a length corresponding at least to that of the depression to be formed thereby, both folding punches of each pair being substantially symmetrical with respect to the common longitudinal medial plane of said bending punches and separated by a distance at least equal to the width of a corrugation of the second set; at least one of said primary or secondary tools being movable in opposite directions with respect to the other tool at least in substantially parallel relation to said medial plane, substantially at right angles to the common longitudinal direction of said punches, so as to be displaceable towards or away from the other tool and said sheet interposed therebetween; rigid conformation and mould-like, releasable clamping means, adapted to engage and to be substantially invariably connected to those sheet portions on either side thereof which must not be deformed so as to prevent their deformations at least in parallel relation to said second direction, said clamping means forming part of at least two distinct assemblies located in substantially symmetrical relationship on either side of said medial plane and said tools, respectively, and movable in translation at least in opposite directions with respect to each other, substantially at right angles to said medial plane, so that they may move towards and away from each other; and actuating means operatively connected to at least the movable tool for causing its relative displacements.

9. A device according to claim 8, wherein each aforesaid assembly is freely movable and comprises guiding means for its relative motion.

10. A device according to claim 8 comprising driving means connected to each aforesaid assembly and monitored by the actuating means of each movable tool to cause their relative complementary motions according to substantially equal displacements, at the same time as that of the movable tool.

11. A device according to claim 10, wherein both of said assemblies are movable in parallel relation to both of the longitudinal medial plane and the direction of motion of the movable tool, whereas driving means monitored by the actuating means of said movable tool, are provided for driving said assemblies in said direction.

12. A device according to claim 11, wherein each assembly comprises at least two confronting plates at least one of which is adapted to be moved closely towards or away from the other and extending generally in substantially parallel relation to the common longitudinal direction of said punches and substantially at right angles to said medial plane, the plate adjacent to the primary tool having its face, which confronts the other plate, of a shape complementary of the back side and sunk corrugations of the first set of the sheet to be interposed between said plates and whereas the corresponding face of the other plate, adjacent to the secondary tool, has a shape complementary of the right side and raised corrugations of the first set of said sheet, so that both plates may closely engage said sheet on either side thereof and conform to the troughs and crests of its corrugations, and means being provided for moving towards each other and maintaining both plates pressed against each other during the forming step of each corrugation of said second set.

13. A device according to claim 12, comprising operating means monitored by said actuating means and adapted to gradually move each pair of the folding punches of said secondary tool towards each other.

14. A device according to claim 12, wherein each punch has substantially the shape of a knife-edge formed by a salient dihedron both faces of which consist of two plate elements, pivotally connected to each other along the edge of said dihedron, both plate elements, which form each dihedral punch of said primary tool being pivotally connected, along their longitudinal outer edges, to those two corresponding plate members of both aforesaid assemblies, respectively, which are adjacent to and on either side of said primary punch, whereas each pair of dihedral punches of said secondary tool have their outer plate elements pivotally connected, along their longitudinal edges, to those two corresponding plate members of said assemblies, respectively, which are adjacent to and on either side of said pair of secondary punches, the inner plate elements of which are pivotally connected, along their longitudinal edges, to an intermediate element along two opposite sides of the latter, said pivotal connections consisting of hinge connections extending substantially parallel to the edges of the dihedrons and means being provided to hold said intermediate element so that its hinges remain at substantially the same distance from the bisecting medial plane of the dihedron forming the primary tool and are substantially symmetrical with respect to said plane which is stationary.

15. A device according to claim 12, comprising at least one substantially horizontal bottom plate, carrying said secondary shaping tool, and supporting two aforesaid assemblies through the medium of spring means; at least one substantially horizontal top plate overlying said bottom plate in substantially registering relationship and integral with said primary shaping tool and carried by said assemblies through the medium of further spring means; guiding and pushing means formed with a cam profile and integral with said top and bottom plates, respectively, and adapted to co-operate, while both top and bottom plates are moving towards each other, in sliding engagement with both assemblies so as to displace them in horizontal symmetrical relationship simultaneously towards each other; and means adapted to move at least one of said overlying plates towards the other.

16. A device according to claim 15, wherein each pair of lower punches forming said secondary tool are slidingly engaging at least an upper substantially plane and horizontal surface portion of said bottom plate and connected to each other by resilient drawback means tending to spread them apart from each other, whereas at least two guiding and pushing members formed with an operative cam profile, are integral with both assemblies, respectively, to co-operate in sliding engagement with said lower punches, respectively, for moving them towards each other during the relative motion of said assemblies, said guiding and pushing members being substantially symmetrical with respect to the medial longitudinal vertical plane of said primary tool.

References Cited

UNITED STATES PATENTS 3,117,616    1/1964    Mesnager _____ 72—385

CHARLES W. LANHAM, *Primary Examiner.*

R. D. GREFE, *Assistant Examiner.*